Nov. 21, 1939.  H. W. HESS  2,180,737
HEAT TREATMENT FOR GLASS
Filed Jan. 2, 1936
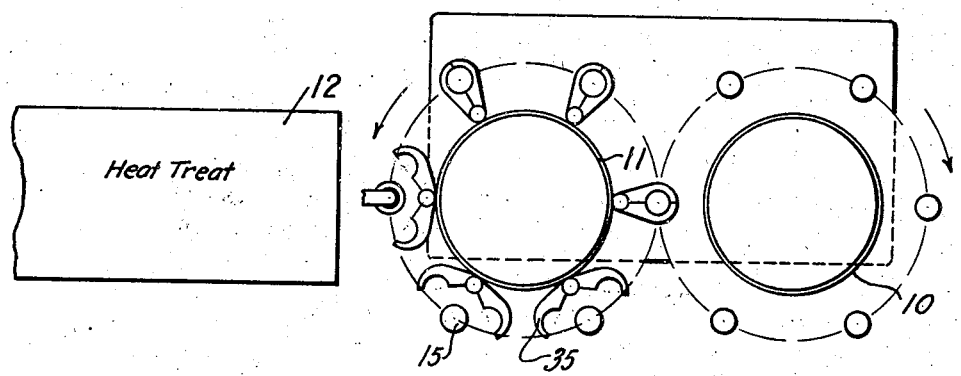
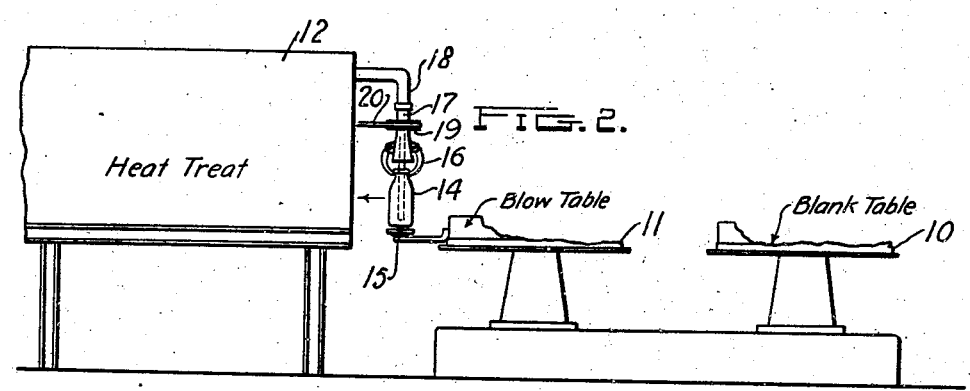
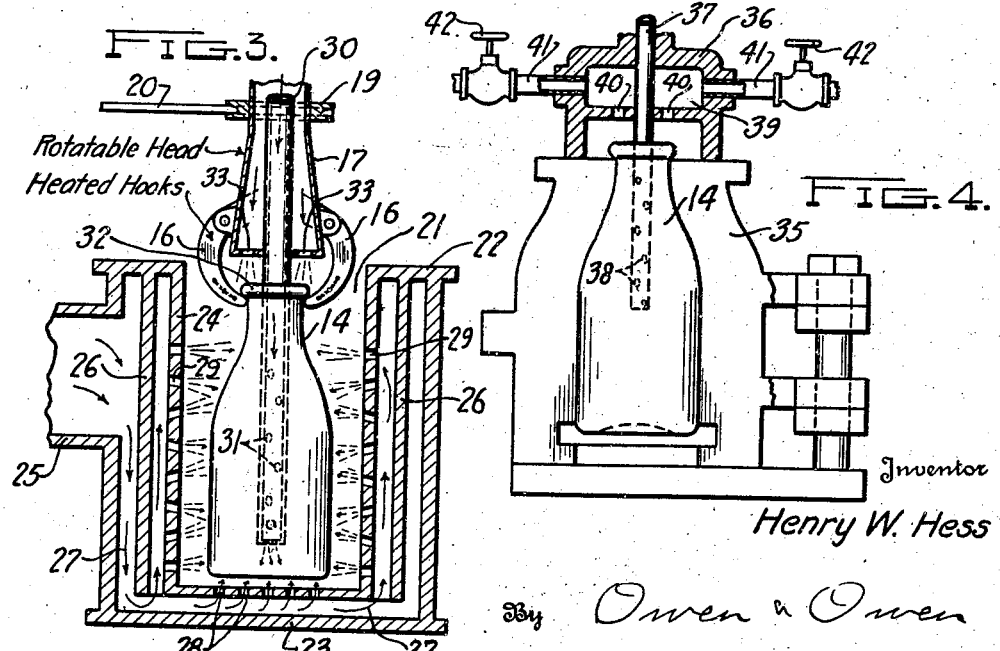
Inventor
Henry W. Hess
By Owen & Owen
Attorneys Patented Nov. 21, 1939

2,180,737

UNITED STATES PATENT OFFICE 2,180,737

HEAT TREATMENT FOR GLASS

Henry W. Hess, Toledo, Ohio

Application January 2, 1936, Serial No. 57,234

1 Claim. (Cl. 49—89)

This invention relates to the formation of heat treated glass, and more particularly to glass that is surface-chilled for strength.

One of the objects of the invention is to surface-chill shaped glass immediately after formation and while it retains heat remaining from its heated, plastic state at the time of shaping. Another object is to prepare hollow glass articles for heat treatment by cooling them approximately uniformly on both inside and outside from a plastic state to a sufficiently firm condition to hold their shapes.

Other objects and details of the invention will appear as the description proceeds. First there will be described one embodiment of the invention, and then variations in the application of the invention will be indicated.

In the accompanying drawing forming part of this specification, Fig. 1 is a diagrammatic plan view of apparatus embodying one form of the invention; Fig. 2 is a side elevation of the apparatus shown in Fig. 1; Fig. 3 is a vertical section of apparatus for heat-treating a glass article; and Fig. 4 is a vertical section illustrating the application of blowing air during the setting of the article from a plastic condition.

In apparatus such as indicated in Fig. 1, there is the usual blank mold carrier 10 and blow mold carrier 11, shown diagrammatically, and a heat-treating apparatus 12. It will be readily understood that the blank-forming and blowing apparatus may be of any known or suitable kind. As is usual, plastic glass is formed by this apparatus into articles that are sufficiently cooled to hold their shapes, but preferably the blown articles are removed from the mold sooner than is customary, or as soon as is possible without incurring deformation. In the form of apparatus shown, it will be noted that the glass is removed from the mold after only one-half a revolution of the blow mold carrier, instead of nearly a whole revolution, as is customary; but the distance the glass travels in the mold is important only as it bears upon removing the article while it is as hot as permissible.

At the time the article is removed from the blow mold, it is preferably just below the point where it will be deformed by its own weight, and it may be that the lower portion is still too hot to support its weight during transportation. The top or ring by which the blank is customarily handled in blank and blow molds is usually set somewhat sooner than the body and, even when equally soft with the body, the blown article can be suspended without as much danger of deformation as where it rests upon its bottom. In the form of apparatus illustrated, the freshly blown bottle 14 is lifted from the bottom 15 of the blow mold by suitable members 16 pivoted to a head 17 rotatably mounted upon a carrier 18. The head may be rotated in any suitable way, a pulley 19 and belt 20 being illustrated diagrammatically. The hooks 16 are preferably heated, before they grasp the bottle, sufficiently to avoid detrimental chilling of the surface of the glass which they contact. The article is then heat-treated by any suitable means which will apply with satisfactory uniformity a cooling gaseous medium, which may be gas of a suitable kind or gas carrying vapor or a fine spray of suitable liquid.

The exact means for applying the cooling fluid is not a part of this invention, but means are diagrammatically indicated to illustrate principles which should be applied. As indicated above, it is preferable to suspend the article by engaging at or near its upper end, for one reason because in this way articles of certain kinds can be removed from the mold more quickly than they could if cooled so that they would support their own weight without deformation if supported from beneath during transportation and heat treatment. Another advantage of suspending the article rather than supporting it from the bottom is the resulting exposure of the bottom to a cooling gaseous medium.

In Fig. 3, there is indicated diagrammatically a heat treating apparatus which comprises the head 17 with the hooks 16 supporting a bottle 14 within a passage 21 between sides 22 and a bottom 23. These sides and bottom are shown as having inner walls 24 which are perforated for the application of a gaseous medium to the surface of the article. The gaseous medium is indicated as being admitted through a pipe 25. A baffle 26 compels the gas to travel in the direction indicated by arrows 27 before reaching the perforations in the sides, so as to avoid excessive differences in the pressure with which the gas is blown from perforations at different points in the wall surrounding the article. As indicated, there are a plurality of perforations 28 beneath the article which direct gaseous medium upon the bottom of the article. These are illustrated as being all straight through the bottom wall of the passage, but it will be understood that they may be arranged at different angles, as the openings 29 in the side walls are shown to be. This direction of the different jets at different angles is so as to produce a turbulent condition within the gaseous medium about the article and to prevent jets impinging upon one portion of the surface more than upon another. By producing and maintaining a turbulent condition in the gaseous medium surrounding the article during the cooling period, it is possible to chill the surface with fair uniformity, but where the walls are of different thicknesses at different portions, it may be desirable to produce a corresponding difference in the amount of cooling fluid impinging upon the different portions of the wall, the thicker portions requiring more cooling. Rotation of the article during cooling facilitates uniform chilling.

In order to cool the inner surfaces concurrently with the cooling of the outer surfaces, the head 17 is shown as being hollow and having a pipe 30 extending down therethrough. This pipe may be manipulated in any suitable manner, and is projected down within the bottle at some time before the chilling is applied thereto. The suitably arranged perforations 31 in the lower end of the pipe 30 apply cooling gaseous medium to the interior of the article, the perforations being arranged so as to produce the desired turbulent condition and also in proper manner to cool various portions of the wall of the article to the desired extent.

In an article such as a milk bottle, shown in the drawing, the neck ring 32 is heavier than the side walls of the bottle. Accordingly, while this neck ring is chilled first and the exterior is set to a self-supporting condition earlier than the lower portion of the bottle, the heat from the interior of the mass of glass reheats the surface to some extent so that the neck ring requires cooling as well as other portions of the article during the heat treatment. Accordingly, perforations 33 are provided in the lower end of head 17 and air or the like is blown through these perforations upon the upper end of the article. The amount and temperature of the air blown upon the upper end of the article in this way will depend upon the nature of the article and the relative degree of cooling required at these surfaces.

It will be readily understood that, in order to produce the desired condition, which has long been known, wherein the surfaces of the glass are first chilled and then the interior sets and shrinks so as to place the surface under compression, it is desirable to have a fairly uniform temperature of the article when chilling begins, and preferably this should be not only fairly uniform as to different portions of the walls, but as to the relative difference between the exterior temperature and the temperature of the interior of the wall at different points, that is, it is preferable to have a temperature differential between the surface and the interior of the glass immediately subjacent thereto which is approximately uniform at all points on the surface and, for the best results, this applies not only to the exterior surface, but to the exterior and interior surfaces also.

In ordinary pressing and blowing operations, the glass is chilled on the exterior by contact with the mold to a materially greater degree than it is chilled on the interior. The air blown into the interior of the mold not only is a poorer conductor of heat than the metal mold, but also is quickly heated so that it approximates the temperature of the glass without great chilling of the glass.

In order to hasten the setting of the glass to proper condition for removal from the mold and at the same time produce in the article the desired uniform differential between the surface temperature and the temperature of the interior of the wall, it is sometimes advantageous to provide for a circulation of air within the article during the blowing period. In Fig. 4, there is diagrammatically illustrated one arrangement for accomplishing this purpose. In this figure, there is shown a typical blow mold with the blown article 14 therein and with a blow head 36 in position to blow the article. In this construction, there is a blow pipe 37 which may be slid through the blow head and projected to any desired extent into the article as the article is blown. As indicated in the drawing, there are perforations 38 provided in the lower end of the pipe and these perforations may be arranged so as to direct the blowing gas or fluid as desired to produce the proper contact of the cooling and blowing fluid with the interior of the article.

The blow head is provided with a chamber 39 with perforations 40 in the bottom thereof and outlets 41 which may be controlled by valves 42. It will be readily seen that blow pipe 37 is smaller in diameter than the neck of the blown article so that the blowing fluid ejected from perforations 38 may escape upwards through the neck of the article and through perforations 40 into chamber 39 and escape therefrom to the degree permitted by valves 42.

It will be readily understood that the blowing means may be varied in accordance with the varying conditions and in accordance with the requirements of articles being blown. When uniform and standardized articles are being blown, it may be sufficient to merely provide fixed escape passages for the blowing fluid, or it may be preferred to provide pressure-controlled escape valves so that the blowing fluid cannot escape until a certain predetermined pressure has been reached. Many other variations of the application of this principle will readily occur, to those skilled in the art, in applying the principle to varying conditions, the fundamental idea being the circulation of the blowing fluid during blowing and immediately thereafter, so as to chill the interior of the article to approximately the same degree as the exterior of the article is chilled by contact with the mold. As previously indicated, this results in the very quick chilling of the article from a plastic condition to a condition in which the exterior is sufficiently set so that the article may be removed from the mold. During this removal and before the final heat treatment, it may be desirable to allow a period within which the heat equalizes to a certain degree.

This circulation of blowing fluid through the article may be used to speed up the time of removal and thus to increase the capacity of blowing apparatus, regardless of the subsequent treatment, and is advantageous to place the glass in desired temperature condition for ordinary annealing or other heat treatment, but has especial advantages in enabling the residual heat to be employed in the type of heat treatment described.

It may be that under some conditions and with certain kinds of glass, all or a portion of the article will set so quickly that it cannot be removed from the mold and heat treatment applied before a portion or all of the wall is below proper temperature for heat treatment, and then it may be necessary to reheat a portion or all of the wall before the final chilling; but preferably at least a large portion of the heat, necessary to have in the article before final chilling is begun, is the heat remaining after the plastic glass has been shaped. In any case, whatever reheating is necessary, before the final chilling, is applied immediately after formation and without intermediate cutting, polishing or annealing of the article.

Where the nature of the article or if the glass, or both, results in difficulty from too quick chilling of a part or all of the article during blowing, the blowing fluid may be preheated, and by allowing it to escape any desired amount of heat may be imparted to the inner surface of the article in the same manner that chilling with cool blowing fluid has been described.

While a separate blank table and blow table are shown, it will be readily understood that the same principles may be applied to any blowing machine however the blank is prepared or introduced into the blowing mold. Likewise, the particular mechanism for effecting the blowing is immaterial, except as it relates to the provision of cooling the interior of the article, if desired. While this interior cooling is not necessary under all circumstances, it is advantageous under certain conditions.

While the method is disclosed above as applied to a blown article, it will be understood that a similar procedure may be followed with pressed glass articles where the article is removed from the press mold while still hot and is heat-treated by chilling the surface, taking advantage of the residual heat in the article when it leaves the mold.

The use of the residual heat in heat treatment for producing case hardened glass by chilling the surface may be applied to sheet glass for certain purposes. For many purposes, glass is polished or surface-treated after being formed into sheets. It has been proposed to reheat these polished sheets and then chill the surfaces. My method may be applied by impinging a proper gaseous chilling medium in turbulent condition upon the surfaces of the sheet while it still retains heat of formation. Such a sheet is economically produced and, of course, is very strong and, even if the surface is unsatisfactory for certain uses to which polished glass is put, there are many uses where extreme transparency is not necessary and where sheet glass formed by my method may be used with entire satisfaction and produced as cheaply as glass previously upon the market which was not heat-treated. Among such uses are for greenhouses, factory windows, etc.

For convenience, the term case hardening is employed in the claims to indicate a degree and uniformity of surface chilling, while the interior of the glass wall is still hot, which results in placing the surface of the cooled article under compression and thereby producing an article much stronger than it would be without this state of surface compression.

What I claim is:

In the manufacture of glass, the method which consists in blowing a hollow article from plastic glass, allowing the escape of blowing gas from the interior of the article during the shaping operation, controlling the speed and temperature of the blowing gas so as to cool the interior surface of the article approximately equally with the cooling of the exterior surface by its contact with the mold, thereafter removing the article from the mold as soon as it will retain its shape while suspended, suspending the removed article and cooling the entire surface of the suspended article substantially uniformly to a point below annealing temperature by applying blasts of moving gases to the entire surface of the article.

HENRY W. HESS.